(12) United States Patent
Hwang

(10) Patent No.: US 8,287,835 B2
(45) Date of Patent: Oct. 16, 2012

(54) ORGANICALLY FUNCTIONALIZED CARBON NANOCAPSULE

(75) Inventor: Gan-Lin Hwang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 680 days.

(21) Appl. No.: 11/896,245

(22) Filed: Aug. 30, 2007

(65) Prior Publication Data

US 2008/0160308 A1 Jul. 3, 2008

Related U.S. Application Data

(63) Continuation-in-part of application No. 10/606,965, filed on Jun. 27, 2003, now abandoned.

(51) Int. Cl.
*B82B 1/00* (2006.01)
*C01B 31/00* (2006.01)

(52) U.S. Cl. .................. 423/445 B; 423/447.2; 977/740

(58) Field of Classification Search .............. 423/445 B, 423/447.2; 977/740
See application file for complete search history.

(56) References Cited

U.S. PATENT DOCUMENTS

| 5,177,248 | A | | 1/1993 | Chiang et al. |
| 5,294,732 | A | | 3/1994 | Chiang et al. |
| 5,560,898 | A | * | 10/1996 | Uchida et al. ................. 423/461 |
| 5,698,175 | A | * | 12/1997 | Hiura et al. ................ 423/447.1 |
| 6,159,742 | A | * | 12/2000 | Lieber et al. .................. 436/164 |
| 6,740,403 | B2 | * | 5/2004 | Gogotsi et al. ................ 428/367 |
| 2003/0159917 | A1 | | 8/2003 | Hwang |
| 2005/0056119 | A1 | | 3/2005 | Hwang |

* cited by examiner

*Primary Examiner* — Stuart Hendrickson

(74) *Attorney, Agent, or Firm* — Birch, Stewart, Kolasch & Birch, LLP

(57) ABSTRACT

An organically functionalized carbon nanocapsule is provided. The organically-functionalized carbon nanocapsule includes a hollow carbon nanocapsule having a purity of at least more than 50% and a surface and at least one kind of organic functional groups bonded thereon and uniformly distributed over the surface thereof. The organically-functionalized carbon nanocapsule is of the following formula: F(-E)n, in which F is the carbon nanocapsule, E is the organic functional group, and n is the number of the organic functional group. By functionalization of high-purity carbon nanocapsules, the application thereof is expanded.

6 Claims, 2 Drawing Sheets

ORGANICALLY FUNCTIONALIZED CARBON NANOCAPSULE

This application is a Continuation-In-Part of U.S. patent application Ser. No. 10/606,965, filed Jun. 27, 2003 now abandoned, and entitled "organically functionalized carbon nanocapsule".

BACKGROUND OF THE INVENTION

1. Field of the Invention

The invention relates to carbon nanocapsules, and in particular to functionalized carbon nanocapsules.

2. Description of the Related Art

A carbon nanocapsule is a polyhedral carbon cluster constituted by multiple graphite layers having a balls-within-a ball structure. The diameter of a carbon nanocapsule is about 3-100 nm. There are two types of carbon nanocapsules: hollow and metal-filled. The center of a hollow carbon nanocapsule is, of course, hollow, while that of a metal-filled nanocapsule is filled with metals, metal oxides, metal carbides, or alloys.

Carbon nanocapsules were first discovered with carbon nanotubes in 1991, in the process of producing carbon nanotubes. Owing to the strong van der Waals force between carbon nanocapsules and carbon nanotubes, it is not easy to isolate carbon nanocapsules from the carbon nanotubes. In addition, the amount of carbon nanocapsules produced with carbon nanotubes is only enough for structural observation under electron microscope, thus the application thereof is obstructed.

By continuous research, processes producing high-purity hollow carbon nanocapsules as well as magnetic metal-filled carbon nanocapsules have been developed. (Please refer to U.S. patent application Ser. Nos. 10/255,669 and 10/329,333) With their special fullerene structure and optoelectronic properties, carbon nanocapsules can be utilized in various fields such as medicine (medical grade active carbon), light and heat absorption, electromagnetic shielding, organic light emitting materials, solar energy receivers, catalysts, sensors, carbon electrodes in lithium batteries, nanoscale composite materials with thermal conductivity and special electrical properties, and nanoscale carbon powder for printing. However, owing to the non-solubility of carbon nanocapsules, the related application is limited and insufficient.

BRIEF SUMMARY OF THE INVENTION

One embodiment of the invention is to functionalize carbon nanocapsules to prepare organically-functionalized carbon nanocapsules, thereby expanding the application thereof.

One embodiment of the invention provides an organically-functionalized carbon nanocapsule. The organically-functionalized carbon nanocapsule includes a hollow carbon nanocapsule having a purity of at least more than 50% and a surface and at least one kind of organic functional groups bonded thereon and uniformly distributed over the surface thereof. The organically-functionalized carbon nanocapsule is of the following formula: F(-E)n, in which F is the carbon nanocapsule, E is the organic functional group, and n is the number of the organic functional group.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
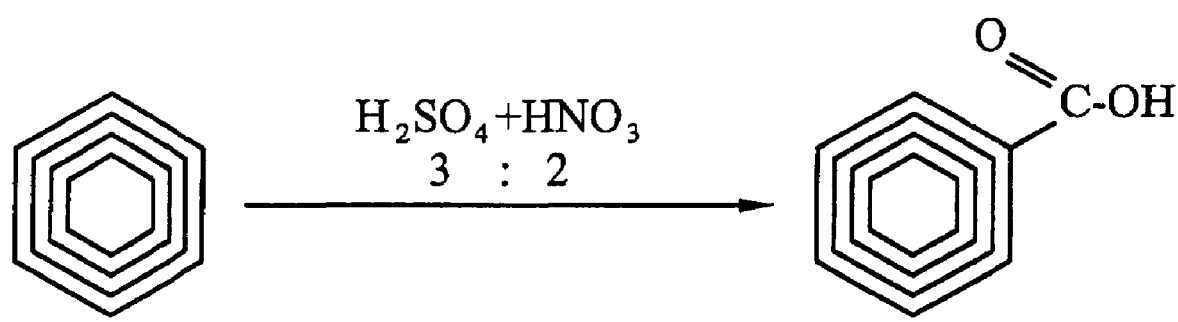
FIG. 1 illustrates the functionalization of carbon nanocapsules involving a redox reaction according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The carbon nanocapsule is a polyhedral carbon cluster constituting multiple graphite layers having a balls-within-a ball structure, and the diameter of the carbon nanocapsule is 3-100 nm.

The carbon nanocapsule is a hollow carbon nanocapsule or a metal-filled carbon nanocapsule filled with metals, metal oxides, metal carbides, or alloys.

Before preparing organically-functionalized carbon nanocapsules, high-purity carbon nanocapsules, for example, at least more than 50% must be prepared first, by the preparation method described, for example, in the above-mentioned references. The carbon nanocapsule obtained is a polyhedral carbon cluster constituting multiple graphite layers having a balls-within-a ball structure, wherein the diameter of a carbon nanocapsule is 3-100 nm. The carbon nanocapsules for preparation of organically-functionalized carbon nanocapsules can be hollow or filled with metals, metal oxides, metal carbides, or alloys.

By functionalization of the carbon nanocapsule, at least one kind of functional groups is bonded on the carbon nanocapsule and uniformly distributed over the surface of the carbon nanocapsule, thereby increasing its reactivity. By functionalization with different functional groups, the reactive variety thereof is enriched, and thereby the application is expanded.

The functionalizing methods of carbon nanocapsules applied in the invention are analogic to those of carbon 60. However, owing to the relatively greater size of carbon nanocapsules, the nano-dispersing technique is important for the control of chemical modifying effects. In addition, carbon nanocapsules have different optical, electrical, and magnetic properties from carbon nanotubes and carbon 60, thus the organically-functionalized carbon nanocapsules have distinct applications.

The carbon nanocapsules can be functionalized by a redox reaction, cycloaddition reaction, or a radical addition reaction. Specifically, the organic functional groups are bonded thereon and uniformly distributed over the surface thereof.

In the redox reaction, the carbon nanocapsule is reacted with a strong oxidant, for example, $H_2SO_4+HNO_3$, $OsO_4$, $KMnO_4$ or $O_3$, to oxidize the surface carbon layer of the carbon nanocapsule and form a functional group, for example, —OH, —C=O, —CHO or —COOH, on the carbon nanocapsule.

In the cycloaddition reaction, the carbon nanocapsule is functionalized via the double bonds on the surface of the carbon nanocapsule. Compounds such as aniline, N,N-dimethylaniline, $CH_2O$ (aldehyde), $CH_3NHCH_2COOH$ (N-substituted glycine derivative), or ($CHCl_3$+KOH), are reacted with the carbon nanocapsule to form functional groups, for example, —NHAr, —N$^+$(CH$_3$)$_2$Ar, =CCl$_2$ or amino groups, on the carbon nanocapsule.

In the radical addition reaction, the carbon nanocapsule is functionalized via the double bonds on the surface of the carbon nanocapsule. The carbon nanocapsule is reacted with a free-radical initiator or molecules capable of producing radicals, for example, K$_2$S$_2$O$_8$, H$_2$O$_2$, methylmethacrylate, or azobis-isobutyronitrile (AIBN), to bond functional groups, for example, —OSO$_3^-$, —OH, —C(CH$_3$)$_2$COOCH$_3$ or —C(CH$_3$)$_2$CN on the carbon nanocapsule.

In the above three kinds of preparation methods, the method involving redox reaction is quite different from the conventional preparation methods of fullerene derivatives. In the redox reaction, strong oxidants are applied to oxidize the surface layers of carbon nanocapsules to form functional groups, for example, —OH, —C=O, —CHO or —COOH, on the surface of carbon nanocapsules. The functionalized carbon nanocapsules are then able to react with any other compounds to form more complicated functionalized carbon nanocapsules. In the preparation methods of fullerene derivatives, however, oxidants are not applied because of the different structure of fullerene molecules. Strong oxidants functionalize molecules by breaking bonds between carbon atoms, which cause damage to a fullerene structure, while still applicable on a carbon nanocapsule by virtue of the multiple-graphite-layer structure.

In addition, U.S. Pat. No. 5,177,248 and U.S. Pat. No. 5,294,732 incorporated herein by reference describe other preparation methods of organically-functionalized carbon nanocapsules.

By functionalization of carbon nanocapsule, an organically-functionalized carbon nanocapsule is provided, comprising a hollow carbon nanocapsule having a purity of at least more than 50% and a surface and at least one kind of organic functional groups bonded thereon and uniformly distributed over the surface thereof, wherein the organically-functionalized carbon nanocapsule is of the following formula: F(-E)n, in which F is the carbon nanocapsule, E is the organic functional group, and n is the number of the organic functional group, for example, n is 1-100,000. Additionally, the carbon nanocapsule has an aspect ratio of about 1-5 or 1-2.

In the organically-functionalized carbon nanocapsule, each E is independently $E_1$, $E_2$, $E_3$, $E_4$ or $E_5$, in which each $E_1$, independently, is $Y_1,Y_2$-amino, ($Y_1,Y_2$-alkyl)amino, $Y_1,Y_2$-ethylendiamino, (dihydroxymethyl)alkylamino, ($X_1,X_3$-aryl)amino, or $X_1,X_3$-aryloxy, each $E_2$, independently, is $Y_1,Y_2$-alkoxy, ($Y_1,Y_2$-amino)alkoxy, ($Y_1,Y_2,Y_3$-aryl)oxy, (dihydroxyalkyl)aryloxy, ($Y_1,Y_2,Y_3$-alkyl)amino, ($Y_1,Y_2,Y_3$-aryl)amino, or dihydroxyalkylamino, each $E_3$, independently, is $Y_1,Y_2,Y_3$-alkoxy, (trihydroxyalkyl)alkoxy, (trihydroxyalkyl)alkylamino, (dicarboxyalkyl)amino, ($Y_1,Y_2,Y_3$-alkyl)thio, ($X_1,X_2$-aryl)thio, ($Y_1,Y_2$-alkyl)thio, (dihydroxyalkyl)thio, $Y_1,Y_2$-dioxoalkyl, each $E_4$, independently, is ((glycosidyl)oxoheteroaryl)amino, ((glycosidyl)oxoaryl)amino, ($X_1,X_2,X_3$-heteroaryl)amino, ($X_1$-diarylketone)amino, (X,$X_1$-oxoaryl)amino, (X,$X_1$-dioxoaryl)amino, ($Y_1$-alkyl,$Y_2$-alkyldioxoheteroaryl)amino, ($Y_1$-alkyl,$Y_2$-alkyldioxoaryl)amino, (di($Y_1,Y_2$-methyl)dioxoheteroaryl)amino, (di($Y_1,Y_2$-methyl)dioxoaryl)amino, ((glycosidyl)heteroaryl)amino, ((glycosidyl)aryl)amino, ((carboxylacetylalkyl)oxoheteroaryl)amino, ((carboxylacetylalkyl)oxoaryl)amino, ((isopropylaminohydroxyalkoxy)aryl)amino, or ($X_1,X_2,X_3$-alkylaryl)amino, and each $E_5$, independently, is ($X_1,X_2,X_3$-heteroaryl)oxy, (isopropylaminohydroxyalkyl)aryloxy, ($X_1,X_2,X_3$-oxoheteroaryl)oxy, ($X_1,X_2,X_3$-oxoaryl)oxy, ($X_1,Y_1$-oxoheteroaryl)oxy, ($X_1$-diarylketone)oxy, (X,$X_1$-oxoaryl)oxy, (X,$X_2$-dioxoaryl)oxy, ($Y_1,Y_2$,di-aminodihydroxy)alkyl, ($X_1,X_2$-heteroaryl)thio, ((tricarboxylalkyl)ethylendiamino)alkoxy, ($X_1,X_2$-oxoaryl)thio, ($X_1,X_2$-dioxoaryl)thio, (glycosidylheteroaryl)thio, (glycosidylaryl)thio, $Y_1$-alkyl(thiocarbonyl)thio, $Y_1,Y_2$-alkyl(thiocarbonyl)thio, $Y_1,Y_2,Y_3$-alkyl(thiocarbonyl)thio, ($Y_1,Y_2$-aminothiocarbonyl)thio, (pyranosyl)thio, cysteinyl, tyrosinyl, (phenylalanyl)amino, (dicarboxyalkyl)thio, (aminoaryl)$_{1-20}$ amino, or (pyranosyl)amino.

Each X, independently, is halide, each of $X_1$ and $X_2$, independently, is —H, —$Y_1$, —O—$Y_1$, —S—$Y_1$, —NH—$Y_1$, —CO—O—$Y_1$, —O—CO—$Y_1$, —CO—NH—$Y_1$, —CO—N$Y_1Y_2$, —NH—CO—$Y_1$, —SO$_2$—$Y_1$, —CH$Y_1Y_2$, or —N$Y_1Y_2$, and each $X_3$, independently, is —$Y_1$, —O—$Y_1$, —S—$Y_1$, —NH—$Y_1$, —CO—O—$Y_1$, —O—CO—$Y_1$, —CO—NH—$Y_1$, —CO—N$Y_1Y_2$, —NH—CO—$Y_1$, —SO$_2$—$Y_1$, —CH$Y_1Y_2$ or —N$Y_1Y_2$;

Each X, independently, is halide, each of $X_1$ and $X_2$, independently, is —H, —$Y_1$, —O—$Y_1$, —S—$Y_1$, —NH—$Y_1$, —CO—O—$Y_1$, —O—CO—$Y_1$, —CO—NH—$Y_1$, —CO—N$Y_1Y_2$, —NH—CO—$Y_1$, —SO$_2$—$Y_1$, —CH$Y_1Y_2$, or —N$Y_1Y_2$, and each $X_3$, independently, is —$Y_1$, —O—$Y_1$, —S—$Y_1$, —NH—$Y_1$, —CO—O—$Y_1$, —O—CO—$Y_1$, —CO—NH—$Y_1$, —CO—N$Y_1Y_2$, —NH—CO—$Y_1$, —SO$_2$—$Y_1$, —CH$Y_1Y_2$ or —N$Y_1Y_2$.

Each of $Y_1$, $Y_2$ and $Y_3$, independently, is —B-Z.

Each B, independently, is —R$_a$—O—[Si(CH$_3$)$_2$—O—]$_{1-100}$, C$_{1-2000}$ alkyl, C$_{6-40}$ aryl, C$_{7-60}$ alkylaryl, C$_{7-60}$ arylalkyl, (C$_{1-30}$ alkyl ether)$_{1-100}$, (C$_{6-40}$ aryl ether)$_{1-100}$, (C$_{7-60}$ alkylaryl ether)$_{1-100}$, (C$_{7-60}$ arylalkyl ether)$_{1-100}$, (C$_{1-30}$ alkyl thioether)$_{1-100}$(C$_{6-40}$ aryl thioether)$_{1-100}$, (C$_{7-60}$ alkylaryl thioether)$_{1-100}$, (C$_{7-60}$ arylalkyl thioether)$_{1-100}$, (C$_{2-50}$ alkyl ester)$_{1-100}$, (C$_{7-60}$ aryl ester)$_{1-100}$, (C$_{8-70}$ alkylaryl ester)$_{1-100}$, (C$_{8-70}$ arylalkyl ester)$_{1-100}$, —R—CO—O—(C$_{1-30}$ alkyl ether)$_{1-100}$, —R—CO—O—(C$_{6-40}$ aryl ether)$_{1-100}$, —R—CO—O—(C$_{7-60}$ alkylaryl ether)$_{1-100}$, —R—CO—O—(C$_{7-60}$ arylalkyl ether)$_{1-100}$, (C$_{4-50}$ alkyl urethane)$_{1-100}$ (C$_{14-60}$ aryl urethane)$_{1-100}$, (C$_{10-80}$ alkylaryl urethane)$_{1-100}$ (C$_{10-80}$ arylalkyl urethane)$_{1-100}$, (C$_5$S$_{50}$ alkyl urea)$_{1-100}$, (C$_{14-60}$ aryl urea)$_{1-100}$ (C$_{10-80}$ alkylaryl urea)$_{1-100}$, (C$_{10-80}$ arylalkyl urea)$_{1-100}$, (C$_{2-50}$ alkyl amide)$_{1-100}$, (C$_{7-60}$ aryl amide)$_{1-100}$, (C$_{8-70}$ alkylaryl amide)$_{1-100}$ (C$_{8-70}$ arylalkyl amide)$_{1-100}$, (C$_{3-30}$ alkyl anhydride)$_{1-100}$, (C$_{8-50}$ aryl anhydride)$_{1-100}$, (C$_{9-60}$ alkylaryl anhydride)$_{1-100}$, (C$_{9-60}$ arylalkyl anhydride)$_{1-100}$, (C$_{2-30}$ alkyl carbonate)$_{1-100}$, (C$_{7-50}$ aryl carbonate)$_{1-100}$, (C$_{8-60}$ alkylaryl carbonate)$_{1-100}$, (C$_{8-60}$ arylalkyl carbonate)$_{1-100}$, —R$_1$, —O—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —R$_1$—O—CO—NH—(R$_2$ or Ar—R$_2$—Ar)—NH—CO—O(C$_{2-50}$ alkyl ester, C$_{7-60}$ aryl ester, C$_{8-70}$ alkylaryl ester, or C$_{8-70}$ arylalkyl ester)$_{1-100}$, —R$_1$—C—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —CO—NH—(R$_2$ or Ar—R$_2$—Ar)—NH—CO—O—, —R$_1$—O—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_3$—O—CO—NH—(R$_2$ or Ar—R$_2$—Ar)—NH—CO—O—, —R$_1$—NH—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —R$_1$—NH—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_1$—NH—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —CO—NH—(R$_2$ or Ar—R$_2$—Ar)—NH—

CO—O—, —R$_1$—NH—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_3$—O—CO—NH—(R$_2$ or Ar—R$_2$—Ar)—NH—CO—O—, —R$_1$—O—CO—NH—(R$_2$ or Ar—R$_2$—Ar)—NH—CO—NH—(C$_{2-50}$ alkyl amide, C$_{7-60}$ aryl amide, C$_{8-70}$ alkylaryl amide, or C$_{8-70}$ arylalkyl amide)$_{1-100}$, or —R$_1$—NH—CO—NH—(R$_2$ or Ar—R$_2$—Ar)NH—CO—NH—(C$_{2-50}$ alkyl amide, C$_{7-60}$ aryl amide, C$_{8-70}$ alkylaryl amide, or C$_{8-70}$ arylalkyl amide)$_{1-100}$.

Each Z, independently, is —C-D-, wherein each C, independently, is —R—, —R—Ar—, —Ar—R—, or —Ar—, and each D, independently, is —OH, —SH, —NH$_2$, —NHOH, —SO$_3$H, —OSO$_3$H, —COOH, —CONH$_2$, —CO—NH—NH$_2$, —CH(NH$_2$)—COOH, —P(OH)$_3$, —PO(OH)$_2$, —O—PO(OH)$_2$, —O—PO(OH)—O—PO(OH)$_2$, —O—PO(O—)—O—CH$_2$CH$_2$NH$_3^+$, -glycoside, —OCH$_3$, —O—CH$_2$—(CHOH)$_4$—CH$_{24}$—CH, —O—CH$_2$—(CHOH)$_2$—CHOH, —C$_6$H$_3$(OH)$_2$, —NH$_3^+$, —N$^+$HR$_b$R$_c$, or N$^+$HR$_b$R$_c$R$_d$, wherein each of R, R$_1$, R$_2$, R$_3$, R$_a$, R$_b$, R$_c$, and R$_d$ independently, is C$_{1-30}$ alkyl, each Ar, independently, is aryl.

EXAMPLE 1

Redox Reaction

FIG. 1 illustrates the functionalization of carbon nanocapsules involving a redox reaction.

A reaction flask (1 L) was charged with carbon nanocapsules (1.0 g) dissolved in sulfuric acid/nitric acid (weight ratio=1:1). The mixture was stirred by an ultrasonic cleaner for 10 mins, and then heated to about 140° C. and refluxed for 2 hours. Afterwards, the mixture was centrifuged to separate the carbon nanocapsules from the strong acid, rinsing the carbon nanocapsules thoroughly followed by several centrifuges, until the pH value of carbon nanocapsules approached 7. The carbon nanocapsules obtained were black with —COOH groups bonded thereon. By titration using NaOH, the concentration of the —COOH groups was identified as 13 μmols/per gram carbon nanocapsules. The oxidization of carbon nanocapsules resulted in damage of the surface carbon layers, which could be observed under a transmission electron microscope. The organically-functionalized carbon nanocapsules were soluble in water by virtue of the COOH groups.

EXAMPLE 2

Cycloaddition Reaction

Example 2a

Figure 2A:
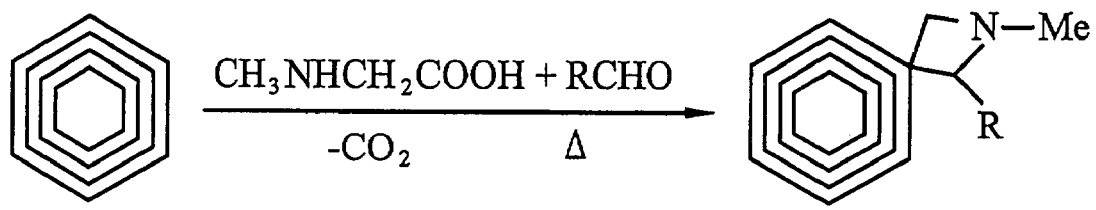
FIG. 2a illustrates the functionalization of carbon nanocapsules involving a cycloaddition reaction in the example 2a of the invention.

FIG. 2a illustrates the functionalization of carbon nanocapsules involving a cycloaddition reaction in the example 2a.

A reaction flask (1 L) was charged with carbon nanocapsules (1.0 g) dissolved in a saturated DMF (dimethyl formamide) solution of aldehyde and N-substituted glycine derivative (molar ratio=1:1). The mixture was then stirred by an ultrasonic cleaner for 10 mins, and heated to about 130° C. and refluxed for 120 hours. Afterwards, the mixture was centrifuged to separate the carbon nanocapsules from the solution. The reaction was as shown in FIG. 2a, with a product soluble in chloroform or water.

Example 2b

Figure 2B:
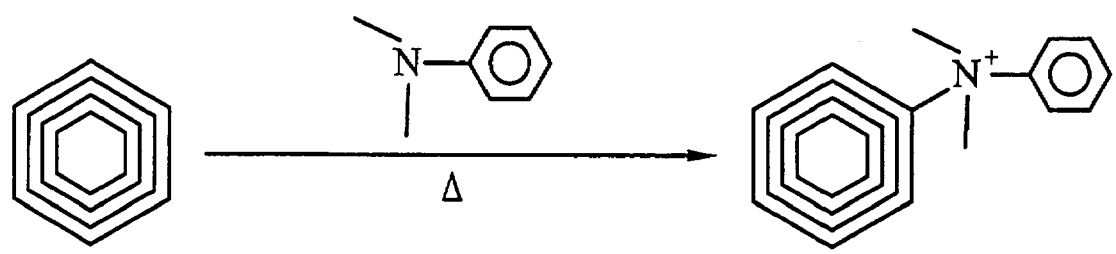
FIG. 2b illustrates the functionalization of carbon nanocapsules involving a radical addition reaction in the example 2b of the invention.

FIG. 2b illustrates the functionalization of carbon nanocapsules involving a radical addition reaction in the example 2b.

A reaction flask (1 L) was charged with carbon nanocapsules (1.0 g) dissolved in N,N-dimethylaniline (500 ml). The mixture was then stirred by an untrasonic cleaner for 10 mins, heated, and refluxed for 12 hours. Afterwards, the mixture was centrifuged to separate the carbon nanocapsules from the solution. The reaction was as shown in FIG. 2b, with a product soluble in water.

EXAMPLE 3

Radical Addition Reaction

Example 3a

A reaction flask (IL) was charged with carbon nanocapsules (100 mg) and K$_2$S$_2$O$_8$ (120 mg) dissolved in water (500 ml). The solution mixture was purged with N$_2$ prior to stirring and heating to 70° C. for 5 hours. The product was black carbon nanocapsules with —OSO$_3^-$ groups bonded thereon, easily soluble in water. The radical addition reaction was observed by the electron spin resonance spectrum (ESR), in which the signal at g=2.0032, ΔH$_{pp}$=4.32 G represents the bonding of radicals.

Example 3b

A reaction flask (IL) was charged with carbon nanocapsules (100 mg) and methylmethacrylate (25 ml) dissolved in toluene (250 ml). The solution mixture was illuminated at room temperature to initiate radical generation of methylmethacrylate, thereby reacting with the surface double bonds of the carbon nanocapsules. The radical addition reaction was observed by the electron spin resonance spectrum (ESR), in which signals at g=2.0033, ΔH$_{pp}$=8.56 G and g=2.0037, ΔH$_{pp}$=4.44 G represent the bonding of radicals.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An organically-functionalized carbon nanocapsule, comprising:
   a hollow carbon nanocapsule of a polyhedral carbon cluster constituting multiple graphitic layers having a purity of at least more than 50% and a surface, wherein the carbon nanocapsule has an aspect ratio of about 1-2; and
   at least one organic functional groups bonded thereon and uniformly distributed over the surface thereof, wherein the organically-functionalized carbon nanocapsule is of the following formula:
   F(-E)n, in which F is the carbon nanocapsule, E is the organic functional group, and n is the number of the organic functional group, wherein each E is independently E$_1$, E$_2$, E$_3$, E$_4$ or E$_5$, in which each E$_1$, independently, is Y$_1$,Y$_2$,-amino, (Y$_1$,Y$_2$-alkyl) amino, Y$_1$, Y$_2$ -ethylenediamino, (dihydroxymethyl)alkylamino, (X$_1$,X$_3$-aryl)amino, or X$_1$,X$_3$-aryloxy; each E$_2$, independently, is Y$_1$,Y$_2$-alkoxy, (Y$_1$,Y$_2$-amino)alkoxy, (Y$_1$, $Y_2,Y_3$-aryl)oxy, (dihydroxyalkyl)aryloxy, $(Y_1,Y_2,Y_3$-alkyl)amino, $(Y_1,Y_2,Y_3$-aryl)amino, or dihydroxyalkylamino; each $E_3$, independently, is $Y_1,Y_2,Y_3$-alkoxy, (trihydroxyalkyl)alkoxy, (trihydroxyalkyl)alkylamino, (dicarboxyalkyl)amino, $(Y_1,Y_2,Y_3$-alkyl) thio, $(X_1,X_2$-aryl)thio, $(Y_1,Y_2$-alkyl)thio, (dihydroxyalkyl)thio, $Y_1,Y_2$-dioxoalkyl; each $E_4$, independently, is ((glycosidyl)oxoheteroaryl)amino, ((glycosidyl)oxoaryl)amino, $(X_1,X_2,X_3$-heteroaryl)amino, $(X_1$-diarylketone)amino, $(X,X_1$-oxoaryl)amino, $(X,X_1$-dioxoaryl) amino, $(Y_1$-alkyl, $Y_2$-alkyldioxoheteroaryl)amino, $(Y_1$-alkyl, $Y_2$-alkyldioxoaryl)amino, (di$(Y_1,Y_2$-methyl)dioxoheteroaryl)amino, (di$(Y_1,Y_2$-methyl)dioxoaryl)amino, ((glycosidyl)heteroaryl)amino, ((glycosidyl)aryl)amino, ((carboxylacetylalkyl)oxoheteroaryl)amino, ((carboxylacetylalkyl)oxoaryl)amino, ((isopropylaminohydroxyalkoxy)aryl)amino, or $(X_1,X_2,X_3$-alkylaryl)amino; each $E_5$, independently, is $(X_1,X_2,X_3$-heteroaryl)oxy, (isopropylaminohydroxyalkyl)aryloxy, $(X_1,X_2,X_3$-oxoheteroaryl)oxy, $(X_1,X_2,X_3$-oxoaryl)oxy, $(X_1,Y_1$-oxoheteroaryl)oxy, $(X_1$-diarylketone)oxy, $(X,X_1$-oxoaryl)oxy, $(X_1,X_2$-dioxoaryl)oxy, $(Y_1,Y_2,$di-aminodihydroxy)alkyl, $(X_1,X_2$-heteroaryl)thio, ((tricarboxylalkyl)ethylenediamino)alkoxy, $(X_1,X_2$-oxoaryl)thio, $(X_1,X_2$-dioxoaryl)thio, (glycosidylheteroaryl)thio, (glycosidylaryl)thio, $Y_1$-alkyl(thiocarbonyl)thio, $Y_1,Y_2$-alkyl(thiocarbonyl)thio, $Y_1,Y_2,Y_3$-alkyl(thiocarbonyl)thio, $(Y_1,Y_2$-aminothiocarbonyl)thio, (pyranosyl)thio, cysteinyl, tyrosinyl, (phenylalainyl)amino, (dicarboxyalkyl)thio, (aminoaryl)$_{1-20}$ amino, or (pyranosyl)amino; each X, independently, is halide; each of $X_1$ and $X_2$, independently, is —H, —$Y_1$, —O—$Y_1$, —S—$Y_1$, —NH—$Y_1$, —CO—O—$Y_1$, —O—CO—$Y_1$, —CO—NH—$Y_1$, —CO—N$Y_1Y_2$, —NH—CO—$Y_1$, —SO$_2Y_1$, —CH$Y_1Y_2$, or —N$Y_1Y_2$; each $X_3$, independently, is —$Y_1$, —O—$Y_1$, —S—$Y_1$, —NH—$Y_1$, —CO—O—$Y_1$, —O—CO—$Y_1$, —CO—NH —$Y_1$, —CO—N$Y_1Y_2$, NH—CO—$Y_1$, —SO$_2$—$Y_1$, —CH$Y_1Y_2$or —N$Y_1Y_2$; each of $Y_1$, $Y_2$ and $Y_3$, independently, is —B—Z; each B, independently, is —R$_a$—O—[Si(CH$_3$)$_2$—O—]$_{1-100}$, C$_{1-2000}$ alkyl, C$_{6-40}$ aryl, C$_{7-60}$ alkylaryl, C$_{7-60}$ arylalkyl, (C$_{1-30}$ alkyl ether)$_{1-100}$, (C$_{6-40}$ aryl ether)$_{1-100}$, (C$_{7-60}$ alkylaryl ether)$_{1-100}$, (C$_{7-60}$ arylalkyl ether)$_{1-100}$, (C$_{1-30}$ alkyl thioether)$_{1-100}$(C$_{6-40}$ aryl thioether)$_{1-100}$, (C$_{7-60}$ alkylaryl thioether)$_{1-100}$, (C$_{7-60}$arylalkyl thioether)$_{1-100}$, (C$_{2-50}$ alkyl ester)$_{1-100}$, (C$_{7-60}$ aryl ester)$_{1-100}$, (C$_{8-70}$ alkylaryl ester)$_{1-100}$, (C$_{8-70}$ arylalkyl ester)$_{1-100}$, —R—CO—O—(C$_{1-30}$ alkyl ether)$_{1-100}$, —R—CO—O—(C$_{6-40}$ aryl ether)$_{1-100}$, —R—CO—O—(C$_{7-60}$ alkylaryl ether)$_{1-100}$, —R—CO—O—(C$_{7-60}$ arylalkl ether)$_{1-100}$, (C$_{4-50}$ alkyl urethane)$_{1-100}$(C$_{14-60}$ aryl urethane)$_{1-100}$, (C$_{10-80}$ alkylaryl urethane)$_{1-100}$ (C$_{10-80}$ arylalkyl urethane)$_{1-100}$, (C$_{5-50}$ alkyl urea)$_{1-100}$, (C$_{14-60}$ aryl urea)$_{1-100}$ (C$_{10-?}$alkylaryl urea)$_{1-100}$, (C$_{10-80}$ arylalkyl urea)$_{1-100}$, (C$_{2-50}$ alkyl amide)$_{1-100}$, (C$_{7-60}$ aryl amide)$_{1-100}$, (C$_{8-70}$ alkylaryl amide)$_{1-100}$ (C$_{8-70}$ arylalkyl amide)$_{1-100}$, (C$_{3-30}$ alkyl anhydride)$_{1-100}$, (C$_{8-50}$ aryl anhydride)$_{1-100}$, (C$_{9-60}$ alkylaryl anhydride)$_{1-100}$, (C$_{9-60}$ arylalkyl anhydride)$_{1-100}$, (C$_{2-30}$ alkyl carbonate)$_{1-100}$, (C$_{7-50}$ aryl carbonate)$_{1-100}$, (C$_{8-60}$ alkylaryl carbonate)$_{1-100}$, (C$_{8-60}$ arylalkyl carbonate)$_{1-100}$, —R$_1$—O—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —R$_1$—O—CO—NH—(R$_2$ or Ar—R$_2$—Ar)—NH—CO—O(C$_{2-50}$ alkyl ester, C$_{7-60}$ aryl ester, C$_{8-70}$ alkylaryl ester, or C$_{8-70}$ arylalkyl ester)$_{1-100}$, —R$_1$—C—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —CO—NH—(R$_2$ or Ar—R$_2$—Ar)—NH—CO—O—, —R$_1$—O—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_3$—O—CO—NH—(R$_2$ or Ar—R$_2$—Ar)—NH—CO—O—, —R$_1$—NH—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —R$_1$—NH—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_1$—NH—CO—NH—(R$_2$ or Ar—R$_2$—Ar)—NH—CO—O—(C$_{1-30}$ alkyl ether, C$_{6-40}$ aryl ether, C$_{7-60}$ alkylaryl ether, or C$_{7-60}$ arylalkyl ether)$_{1-100}$, —CO—NH—(R$_2$ or Ar—R$_2$—Ar)—NH—CO—O—, —R$_1$—NH—CO—NH—(R$_2$ or Ar—R$_2$—Ar)—NH—CO—O—(C$_{2-50}$ alkyl ester, C$_{7-60}$ aryl ester, C$_{8-70}$ alkylaryl ester, or C$_{8-70}$ arylalkyl ester)$_{1-100}$, —R$_3$—O—CO—NH—(R$_2$ or Ar—R$_2$—Ar)—NH—CO—O—, —R$_1$—O—CO—NH—(R$_2$ or Ar—R$_2$—Ar)—NH—CO—NH—(C$_{2-50}$ alkyl amide, C$_{7-60}$ aryl amide, C$_{8-70}$ alkylaryl amide, or C$_{8-70}$ arylalkyl amide)$_{1-100}$, or —R$_1$—NH—CO—NH—(R$_2$ or Ar—R$_2$—Ar)NH—CO—NH—(C$_{2-50}$ alkyl amide, C$_{7-60}$ aryl amide, C$_{8-70}$ alkylaryl amide, or C$_{8-70}$ arylalkyl amide)$_{1-100}$; each Z, independently, is -M-D, wherein each M, independently, is —R—, —R—Ar—, —Ar—R—, or —Ar—; and each D, independently, is —OH, —SH, —NH$_2$, —NHOH, —SO$_3$H, —OSO$_3$H, —COOH, —CONH$_2$, —CO—NH—NH$_2$, —CH(NH$_2$)—COOH, —P(OH)$_3$, —PO(OH)$_2$, —O—PO(OH)$_2$, —O—PO(OH)—O—PO(OH)$_2$, —O—PO(O)—O—CH$_2$CH$_2$NH$_3^+$, -glycoside, —OCH$_3$, —O—CH$_2$—(CHOH)$_4$—CH$_{24}$—CH, —O—CH$_2$—(CHOH)$_2$—CHOH, —C$_6$H$_3$(OH)$_2$, —NH$_3^+$, —N$^+$HR$_b$R$_c$, or N$^+$HR$_b$R$_c$R$_d$; wherein each of R, R$_1$, R$_2$, R$_3$, R$_a$, R$_b$, R$_c$, and R$_d$ independently, is C$_{1-30}$ alkyl, each Ar, independently, is aryl.

2. The organically-functionalized carbon nanocapsule as claimed in claim 1, wherein the diameter of a carbon nanocapsule is 3-100 nm.

3. The organically-functionalized carbon nanocapsule as claimed in claim 1, wherein n is 1-100,000.

4. The organically-functionalized carbon nanocapsule as claimed in claim 1, wherein the carbon nanocapsule is functionalized by a redox reaction.

5. The organically-functionalized carbon nanocapsule as claimed in claim 1, wherein the carbon nanocapsule is functionalized by a cycloaddition reaction.

6. The organically-functionalized carbon nanocapsule as claimed in claim 1, wherein the carbon nanocapsule is functionalized by a radical addition reaction.

* * * * *